United States Patent [19]

Takada et al.

[11] Patent Number: 4,985,535
[45] Date of Patent: Jan. 15, 1991

[54] MOISTURE-CURABLE HOT-MELT ADHESIVE COMPOSITION

[75] Inventors: Masaharu Takada, Osaka; Masaru Sugimori, Takatsuki, both of Japan

[73] Assignee: Sunstar Engineering Inc., Osaka, Japan

[21] Appl. No.: 435,723

[22] Filed: Nov. 14, 1989

[30] Foreign Application Priority Data

Nov. 18, 1988 [JP] Japan .................. 63-292208

[51] Int. Cl.$^5$ .............................. C08G 63/02
[52] U.S. Cl. ..................... 528/272; 528/274; 528/295.5; 528/300; 528/308.1; 525/437; 525/440; 524/77
[58] Field of Search ............ 528/272, 274, 295.5, 528/300, 308.1; 525/437, 440; 524/77

[56] References Cited

U.S. PATENT DOCUMENTS

| | | | |
|---|---|---|---|
| 3,372,148 | 3/1968 | Wiener | 428/473 |
| 3,931,077 | 1/1976 | Uchigaki et al. | 524/273 |
| 4,242,488 | 12/1980 | Stanley et al. | 428/423.1 |
| 4,443,518 | 4/1984 | Martins et al. | 428/336 |
| 4,443,519 | 4/1984 | Donermeyer et al. | 428/336 |
| 4,543,393 | 9/1985 | Blum et al. | 525/124 |
| 4,551,518 | 11/1985 | Matsumoto et al. | 528/80 |
| 4,625,012 | 11/1986 | Rizk et al. | 528/28 |
| 4,649,214 | 3/1987 | Gladfelter et al. | 560/120 |
| 4,756,785 | 7/1988 | König et al. | 156/307.3 |
| 4,820,368 | 4/1989 | Markevka et al. | 156/307.3 |
| 4,889,915 | 12/1989 | Brauer et al. | 525/458 |
| 4,891,269 | 1/1990 | Markevka et al. | 428/423 |

*Primary Examiner*—John Kight, III
*Assistant Examiner*—Sam A. Acquah
*Attorney, Agent, or Firm*—Wegner, Cantor, Mueller & Player

[57] ABSTRACT

A moisture-curable hot-melt adhesive composition comprising a reaction product obtainable by reacting (A) a mixture of (a) a high molecular weight thermoplastic polyester component predominantly composed of a hydroxy-terminated high molecular weight polyester containing a hydrocarbon chain with a molecular weight of 600 to 6,000 and having a molecular weight of 8,000 to 25,000 and (b) a low molecular weight polyol having a molecular weight of not more than 5,000 with (B) a polyisocyanate compound in an NCO/OH ratio of 1.4 through 3.

This moisture-curable hot-melt adhesive composition is useful for the adhesion at a low temperature, and shows an excellent heat resistance and initial physical properties.

18 Claims, No Drawings

MOISTURE-CURABLE HOT-MELT ADHESIVE COMPOSITION

BACKGROUND OF THE INVENTION

1. Field of the Invention

The present invention relates to a moisture-curable hot-melt adhesive and more particularly to a moisture-curable hot-melt adhesive composition which requires only a comparatively low temperature for the adhesion of automotive window glass and other adherends and gives a bond which is highly resistant to heat and has improved initial physical properties in terms of strength, elongation and modulus.

2. Brief Description of the Prior Art

As a known moisture-curable hot-melt adhesive, there is a prepolymer composition obtainable by reacting a thermoplastic saturated polyester polyol having a molecular weight not exceeding 6,000 with an isocyanate compound. This composition is low in melting temperature and can be cured at a low temperature. Moreover, while the cured composition has satisfactory heat resistance, it is unsatisfactory in initial physical properties.

By way of illustration, the conventional moisture-curable one-package urethane adhesive used in the automotive production line will not be completely cured even when the finished automobile rolls out at the end of the assembly line, and is frequently subjected to various impacts and vibrations, for example due to opening and closing of the doors, in the uncured condition. Furthermore, when window glass, for instance, is set up in position on the production line and the finished automobile is stocked outdoors within a brief time of, say, 2 hours after bonding, or when the automobile is stocked outdoors in the dry winter months, the adhesive is hardly allowed to cure. Particularly for production lines located in frigid areas, a moisture-curable hot-melt adhesive providing a satisfactory bond with sufficient initial physical properties at comparatively low temperatures is keenly required.

The object of the present invention is to provide a moisture-curable hot-melt adhesive composition which insures a sufficiently tough bond at low temperatures and excellent initial physical characteristics, and a method for production of such adhesive composition.

The inventors of the present invention found that when a thermoplastic urethane prepolymer is synthesized by reacting an excess of a polyisocyanate compound with a polyol component consisting of a high molecular polyester polyol containing a soft segment and a low molecular polyol compatible with said soft segment, the high molecular weight polyol contributes to the early onset of initial physical properties, while the low molecular polyol acts to lower the melting temperature of the composition, with the additional effect of improved adhesion, thus allowing one to take advantage of the inherent physical properties of thermoplastic polyester resins.

SUMMARY OF THE INVENTION

The present invention is directed to:

a moisture-curable hot-melt adhesive composition comprising a reaction product obtainable by reacting (i) a mixture of a high molecular thermoplastic polyester component predominantly composed of (a) a hydroxyterminated high molecular weight thermoplastic polyester having a molecular weight of 8,000 to 25,000 and containing a hydrocarbon chain with a molecular weight of 600 to 6,000 and (b) a low molecular polyol having a molecular weight not exceeding 5,000 with (ii) a polyisocyanate in an NCO/OH of 1.4 through 3.

The present invention relates, in another aspect, to a method of producing said moisture-curable hot-melt adhesive composition.

DETAILED DESCRIPTION OF THE INVENTION

The component compounds of the adhesive composition of the invention are described in detail below.

(i) (a) Polyester

The high molecular thermoplastic polyester to be used in the composition of the present invention is a block polyester containing a hard segment (polar segment) and a soft segment which is a hydrocarbon chain with a molecular weight of 600 to 6,000.

The carboxylic acid component which can be used in the formation of the hard segment of such block polyester includes, among others, terephthalic acid, isophthalic acid, dimethyl terephthalate, diethyl terephthalate, phthalic anhydride, succinic acid, succinic anhydride, glutaric acid, adipic acid, azelaic acid, sebacic acid, dodecanedioic acid, icosanedioic acid, ε-caprolactone, naphthalenedicarboxylic acid, trimellitic acid, decanedicarboxylic acid, octadecanedicarboxylic acid, dimer acids, methylhexahydrophthalic acid, methylhexahydrophthalic anhydride, methyltetrahydrophthalic acid, methyltetrahydrophthalic anhydride, hexahydrophthalic acid, hexahydrophthalic anhydride, tetrahydrophthalic acid, 1,3-cyclohexanedicarboxylic acid, 1,4-cyclohexanedicarboxylic anhydride, fumaric acid and so on.

The polyol component which is to be copolymerized with said carboxylic acid component includes, among others, ethylene glycol, propanediol, 1,4-butanediol, 1,5-pentanediol, 1,6-hexanediol, 1,10-decanediol, diethylene glycol, trimethylene glycol, neopentyl glycol, polyethylene glycol, propylene glycol, dipropylene glycol, polypropylene glycol, 1,4-cyclohexanedimethanol, 1,4-cyclohexanediol, polytetramethylene glycol, trimethylolpropane, pentaerythritol, bisphenol A, bisphenol F, hydrogenated bisphenol A, hydrogenated bisphenol F and so on. Particularly desirable is a combination of terephthalic acid with ethylene glycol.

As the material for the soft segment, hydroxyterminated 1,2-polybutadine or/and 1,4-polybutadiene or a hydrogenation product thereof, in the molecular weight range of 600 to 6,000 and, for better results, 1,000 to 4,000, is preferably used.

The polyester to be used in the adhesive composition of the present invention can be synthesized by subjecting one or more of said carboxylic acids, one or more of said polyols and said soft segment component to dehydrative condensation reaction to give a polyester resin containing 1 to 15 moles, preferably 1 to 4 moles, of the soft segment either at one terminus, both termini and/or within the molecular chain (Japanese laid-open Patent Application No. 59-215373/1984).

The polyester component to be used in the adhesive composition of the invention is a hydroxy-terminated polyester polyol. The molecular weight of said polyester is in the range of 8,000 to 25,000 and preferably 10,000 to 18,000. If the molecular weight is less than 8,000, the initial physical properties will not be sufficiently satisfactory, and also, the melt viscosity will be too low. On the other hand, if the molecular weight exceeds 25,000, the melt viscosity will be too high to be satisfactory.

As representative examples of such polyester resin, there may be mentioned ELITEL ® UE-4100, 4200, 4300, 4400 and 4500 (manufactured by Unitika Ltd.)

The thermoplastic polyester to be used in the adhesive composition of the present invention is preferably such that said block polyester accounts for not less than 50 weight % thereof, preferably not less than 70 weight % thereof, and the remainder may be the usual polyester composed of said carboxylic acid and polyol components.

(i) (b) Low molecular weight polyol

The low molecular weight polyol to be used in accordance with the present invention may be either liquid or solid and has a molecular weight not over 5,000 and preferably in the range of 1,000 to 3,000. If the molecular weight exceeds 5,000, the melt viscosity of the high molecular weight thermoplastic polyester is not sufficiently lowered.

As examples of such low molecular weight polyol, there may be mentioned polyether polyol, polyester polyol, hydroxy-containing polybutadiene polyol, acrylic polyol, castor oil derivatives, tall oil derivatives and so on.

(Polyether polyol)

The above-mentioned polyether polyol, that is to say a polyoxyalkylene ether polyol, is a polyoxyethylene-polypropylene polyol, which is a random or block copolymer obtainable by ring-opening polymerization of propylene oxide and ethylene oxide in the presence of one or more low molecular weight active hydrogen compounds each having at least two active hydrogen atoms, or a polyoxytetramethylene glycol which is obtainable by ring-opening polymerization of tetrahydrofuran, and contains 2 to 3 hydroxy groups per molecule weight. Examples of said low molecular active hydrogen compounds include various diols such as ethylene glycol, propylene glycol, butylene glycol, 1,4-butanediol, 1,5-pentanediol, 1,6-hexanediol, neopentyl glycol, etc., triols such as glycerol, trimethylolpropane, 1,2,6-hexanetriol, etc.; ammonia and various amines such as methylamine, ethylamine, propylamine, butylamine and so on.

(Polyester polyol)

The low molecular weight polyester polyol is also generally produced by reacting a polybasic acid with a polyhydric alcohol or by ring-opening polymerization between a polyhydric alcohol and ε-caprolactone or the like, and is hydroxy-terminated. Specific examples of the polybasic acid mentioned above include phthalic acid, terephthalic acid, isophthalic acid, phthalic anhydride, succinic acid, adipic acid, azelaic acid, sebacic acid, dodecanoic acid, icosanedioic acid, ε-caprolactone, trimellitic acid, dimer acids, p-hydroxybenzoic acid, dimerized linolenic acid, maleic acid, etc. and the corresponding di-lower alkyl esters.

The polyhydric alcohols mentioned above include, in addition to the above-mentioned diols and triols, diethylene glycol, triethylene glycol, dipropylene glycol, tripropylene glycol, polytetramethylene glycol, 1,4-cyclohexanedimethanol, pentaerythritol and so on.

The low molecular weight polyester polyol to be used in the composition of the present invention can be prepared by polymerizing said carboxylic acid and polyol components.

In the adhesive composition according to the present invention, one or more polyols, among the aforementioned low molecular weight polyols, which are compatible with said high molecular weight polyols, are employed.

In the adhesive composition of the present invention, the proportion of said low molecular weight polyol component is 5 to 150 parts by weight, preferably 10 to 50 parts by weight, to each 100 parts by weight of said high molecular weight polyester component. If the proportion of said low molecular weight polyol component is less than 5 parts by weight, the melt viscosity of the adhesive composition will not be sufficiently decreased, while the use of the low molecular weight polyol in excess of 150 parts by weight will adversely affect the initial physical properties.

The adhesive composition of the present invention may contain an adhesive promoting resin, namely a natural resin or petroleum resin which is commonly used as a tackifier.

Examples of such natural resin include those in the rosin, rosin ester, hydrogenated rosin ester, terpene, terpenephenol, hydrogenated terpene and other series.

Examples of said petroleum resin are $C_5$ aliphatic resins, $C_9$ aromatic resins, and $C_5/C_6$ copolymer resins.

For reduction of viscosity and/or increasing tackiness, it is preferable to use rosin or terpene resins which are highly compatible with the hard segment of polyester.

The use of such a tackifier lowers the melting temperature and melt viscosity and improves the tackiness of the composition. Thus, with a system exclusively composed of polyester, the crystallinity of the polyester is predominant so that both the melting temperature (about 150° C.) and melt viscosity are too high for sufficient workability.

The proportion of said tackifier is 20 to 150 parts by weight, preferably 50 to 100 parts by weight, to each 100 parts by weight of polyester. If the proportion of the tackifier is less than 20 parts by weight, the melt viscosity of polyester will not be sufficiently lowered. On the other hand, when more than 150 parts by weight of the tackifier is used, the elongation property will be sacrificed to cancel the effect of polyester.

(ii) Polyisocyanate

For the production of the adhesive composition of the present invention, an excess of a polyisocyanate compound reactive to the hydroxy groups of the above-mentioned component is employed.

The compound having at least two isocyanate groups per molecule (hereinafter referred to as polyisocyanate), which is used in the present invention, includes, among others, trimethylene diisocyanate, tetramethylene diisocyanate, hexamethylene diisocyanate, pentamethylene diisocyanate, 2,4,4- or 2,2,4-trimethylhexamethylene diisocyanate, dodecamethylene diisocyanate, 1,3-cyclopentane diisocyanate, 1,4-cyclohexane diisocyanate, 1,3-cyclohexane diisocyanate, 4,4'-methylenebis(cyclohexyl isocyanate), methyl 2,4-cyclohexane diisocyanate, methyl 2,6-cyclohexane diisocyanate, 1,4-bis(isocyanatomethyl)cyclohexane, 1,3-bis(isocyanatomethyl)cyclohexane, m-phenylene diisocyanate, p-phenylene diisocyanate, 1,5-naphthalene diisocyanate, 4,4-diphenylmethane diisocyanate, 2,4- or 2,6-tolylene diisocyanate, 4,4'-toluidine diisocyanate, dianisidine diisocyanate, 4,4'-diphenylether diisocyanate, 1,3- or 1,4-xylylene diisocyanate, ω,ω'-diisocyanato-1,4-diethylbenzene and so on. These polyisocyanates can be used singly or in combination.

The reaction between said polyol component and polyisocyanate compound can be carried out by either of the following procedures.

(1) A mixture of said high molecular weight thermoplastic polyester polyol and said low molecular weight polyol, with or without a tackifier added, is reacted with a polyisocyanate.

(2) The high molecular weight thermoplastic polyester polyol or a mixture thereof with a tackifier is reacted with a polyisocyanate, while said low molecular weight polyol is reacted with a polyisocyanate, and the respective reaction products are admixed.

It should be understood that the tackifier may be added after mixing of the polyisocyanate compound with the polyol component.

The reaction of said polyisocyanate with said high molecular weight and/or low molecular weight polyol component can be conducted under the usual conditions, namely by mixing them under heating at about 100 to 140° C. for about 2 to 5 hours, for instance. The ratio of the reactants in terms of NCO/OH is 1.4 through 3.0 and preferably 2.0 through 2.4. If the NCO/OH ratio is less than 1.4, the pot life of the resulting polyurethane prepolymer will be sacrificed (viscosity buildup). On the other hand, if the ratio exceeds 3, the foaming resistance of the adhesive composition will be adversely affected.

OTHER ADDITIVES

The adhesive composition according to the present invention is characterized in that it contains a thermoplastic polyurethane prepolymer formed by the above-described reaction. For the remainder of the composition, appropriate components may be selectively used in appropriate amounts.

A typical preferred basic formula (by weight; the same applies hereinafter) is 20–80%, preferably 30–60%, of thermoplastic polyurethane prepolymer, not more than 50%, preferably 15–30%, of a filler, not more than 30%, preferably not more than 10%, of a plasticizer, and optionally not more than 30%, preferably not more than 10%, of a thixotropic agent and not more than 30%, preferably not more than 10%, of other additives.

If the proportion of said thermoplastic polyurethane prepolymer in the composition is less than 20%, the adhesion and physical properties will be sacrificed. On the other hand, when the proportion exceeds 80%, the foaming resistance tends to be poor. Specific examples of said filler include silicic anhydride, silicic acid derivatives, talcs, metal powders, calcium carbonate, clays, carbon black and so on. If the proportion of the filler is less than 15%, the curing rate will be too low and the physical properties of the bond be also sacrificed. On the other hand, if the filler accounts for more than 50%, the composition will be too high in viscosity for use as a adhesive and tends to be inadequate in adhesion and physical characteristics.

Examples of said plasticizer include dibutyl phthalate, dioctyl phthalate, diethylhexyl phthalate, dicyclohexyl phthalate, diisooctyl phthalate, diisodecyl phthalate, dibenzyl phthalate, butyl benzyl phthalate, trioctyl phosphate, epoxy plasticizers, toluene-sulfamide, chloroparaffin, adipic acid esters, castor oil and so on. If the plasticizer is used in excess of 30%, adhesion and initial physical properties tend to be adversely affected.

The above-mentioned thixotropic agent includes, among others, bentonite, silicic anhydride, silicic acid derivatives, urea derivatives and so on. If the thixotropic agent is used in a proportion of more than 30%, the adhesive performance and physical properties tend to be adversely affected.

Examples of the additives referred to above include dyes and pigments, curing catalysts, ultraviolet absorbers, tackifiers, flame retardants, silane compounds, dehydrating agents and so on. If the total proportion of such additives exceeds 30%, the adhesive performance and physical properties tend to be sacrificed.

The moisture-curable hot-melt adhesive composition of the present invention, described above, can be cured at low temperature and insures very satisfactory initial physical characteristics.

EXAMPLES

The following examples and comparative examples are further illustrative of the invention. In the examples, physical properties were determined as follows.

Viscosity: Using a BH viscometer with a No. 7 rotor, the viscosity of the sample was measured at 2 rpm and 120° C.

Pot life: The sample heated to 120° C. was applied to steel sheet in an atmosphere of 20° C. and 65% RH and the test was performed using shear testpieces. The time to the onset of interface adhesive failure was regarded as the pot life of the sample.

Initial physical properties: From a 2 mm-thick sheet, No. 2 dumbbell testpieces were prepared. After 2 hours at 20° C. and 65% RH, the modulus (50%, 100%), tensile strength, elongation and hardness of the testpiece were measured.

EXAMPLE 1

A reaction vessel was charged with 50 parts by weight of thermoplastic polyester polyol (ELITEL UE-4200, block type, Unitika Ltd.), 20 parts by weight of thermoplastic polyester polyol (ELITEL UE-3800, random type, Unitika Ltd.), 40 parts by weight of hydrogenated rosin ester (SUPERESTER A-75, a tackifier, Arakawa Chemical Industries, Ltd.), 20 parts by weight of hydrogenated terpene (CLEARON P-85, a tackifier, Yasuhara Oil and Fat Industries, Ltd.), and 30 parts by weight of low molecular weight polyester polyol (KURAPOL P-3010, Kuraray, Ltd.). After stirring at 120° C. for 2 hours, 9 parts by weight of 4,4'-diphenylmethane diisocyanate (MDI) was added and the reaction was conducted at 120° C. for 3 hours to give a thermoplastic polyurethane prepolymer. Then, 30 parts by weight of carbon black as a filler and 0.1 part by weight of dibutyltin dilaurate (DBTDL; 10% solution in DOP) as a catalyst were added to give a moisture-curable hot-melt adhesive composition.

The adhesive performance of this composition, as well as its components, are shown in Table 1.

EXAMPLES 2 and 3

According to the formulas shown in Table 1, adhesive compositions were prepared in the same manner as Example 1.

COMPARATIVE EXAMPLES 1 and 2

According to the formulas shown in Table 1, adhesive compositions were prepared in the same manner as Example 1. In Comparative Example 2, however, the plasticity of the composition was adjusted by adding an adipate plasticizer.

TABLE 1

| Component | Formula (parts by weight) | | | | |
|---|---|---|---|---|---|
| | Example | | | Comparative Example | |
| | 1 | 2 | 3 | 1 | 2 |
| Thermoplastic polyester polyol[1] | 50 | 35 | 70 | — | — |
| Thermoplastic polyester polyol[2] | 20 | 35 | — | 70 | 70 |
| Tackifier resin I[3] | 40 | 40 | 40 | 30 | — |
| Tackifier resin II[4] | 20 | 20 | 20 | — | — |
| Low molecular weight polyol[5] | 30 | 30 | 30 | 30 | 30 |
| Adipic acid ester (plasticizer) | — | — | — | — | 30 |
| 4,4'-Diphenylmethane diisocyanate | 9 | 9 | 9 | 8 | 7.5 |
| Carbon black | 30 | 30 | 30 | 30 | 30 |
| Catalyst (DBTDL: 5%-DOP) | 0.8 | 0.8 | 0.8 | 0.8 | 0.8 |
| Viscosity ($\times 10^4$ cps) | 122 | 114 | 130 | 180 | 130 |
| Pot life (minutes) | 7 | 6 | 8 | 2 | 3 |
| Modulus, 100% | 8.2 | 9.0 | 7.9 | 12.0 | 11.7 |
| Modulus, 50% | 4.0 | 4.4 | 3.8 | 8.3 | 7.5 |
| Tensile strength (kgf/cm$^2$) | 15 | 18 | 13 | 15 | 15 |
| Elongation (%) | 600 | 500 | 600 | 500 | 600 |
| Hardness (Shore A) | 28 | 33 | 25 | 60 | 38 |

[1]ELITEL UE-4200 (Block type, Unitika Ltd.)
[2]ELITEL UE-3800 (random type, Unitika Ltd.)

What is claimed is:

1. A moisture-curable hot-melt adhesive composition comprising a reaction product obtainable by reacting:
   (A) a mixture of:
   (a) a high molecular weight thermoplastic polyester component having a weight average molecular weight of 8,000 to 25,000 and predominantly composed of a hydroxy-terminated high molecular weight polyester which contains a hydrocarbon chain with a weight average molecular weight of 600 to 6,000 and
   a low molecular weight polyol having a weight average molecular weight of not more than 5,000, with
   (B) a polyisocyanate compound in an NCO/OH ratio of 1.4 through 3.

2. The adhesive composition of claim 1 wherein the proportion of said high molecular weight polyester containing a hydrocarbon chain with a weight average molecular weight of 600 to 6,000 accounts for at least 50 weight percent of the total high molecular weight polyester component.

3. A process for producing a moisture-curable hot-melt adhesive composition comprising reacting a mixture of:
   (a) a high molecular weight thermoplastic polyester component having a weight average molecular weight of 8,000 to 25,000 and predominantly composed of a hydroxy-terminated high molecular weight polyester which contains a hydrocarbon chain with a weight average molecular weight of 600 to 6,000 and
   (b) a low molecular weight polyol having a weight average molecular weight of not more than 5,000, with a polyisocyanate compound in an NCO/OH ratio of 1.4 through 3.

4. A process for producing a moisture-curable hot-melt adhesive composition comprising:
   reacting a high molecular weight thermoplastic polyester component having a weight average molecular weight of 8,000 to 25,000 and predominantly composed of a hydroxy-terminated high molecular weight polyester which contains a hydrocarbon chain with a weight average molecular weight of 600 to 6,000 with a polyisocyanate compound,
   reacting a low molecular weight polyol having a weight average molecular weight of not more than 5,000 with a polyisocyanate compound, and
   mixing the respective reaction products.

5. The moisture-curable hot-melt adhesive of claim 1, wherein said high molecular weight thermoplastic polyester component has a weight average molecular weight of 10,000 to 18,000.

6. The moisture-curable hot-melt adhesive of claim 1, wherein said low molecular weight polyol has a weight average molecular weight of 1,000 to 3,000.

7. The moisture-curable hot-melt adhesive of claim 1, wherein a tackifier is mixed with said high molecular weight thermoplastic polyester component.

8. The moisture-curable hot-melt adhesive of claim 1, wherein the NCO/OH ratio is 2.0 through 2.4.

9. The process of claim 3, wherein said high molecular weight thermoplastic polyester component has a weight average molecular weight of 10,000 to 18,000.

10. The process of claim 3, wherein said low molecular weight polyol has a weight average molecular weight of 1,000 to 3,000.

11. The process of claim 3, wherein a tackifier is mixed with said high molecular weigh thermoplastic polyester component.

12. The process of claim 3, wherein the NCO/OH ratio is 2.0 through 2.4.

13. The process of claim 3, wherein the proportion of said high molecular weight polyester containing a hydrocarbon chain with a weight average molecular weight of 600 to 6,000 accounts for at least 50 weight percent of the total high molecular weight polyester component.

14. The process of claim 4, wherein said high molecular weight thermoplastic polyester component has a weight average molecular weight of 10,000 to 18,000.

15. The process of claim 4, wherein said low molecular weight polyol has a weight average molecular weight of 1,000 to 3,000.

16. The process of claim 4, wherein a tackifier is mixed with said high molecular weight thermoplastic polyester component.

17. The process of claim 4, wherein the NCO/OH ratio is 2.0 through 2.4.

18. The process of claim 4, wherein the proportion of said high molecular weight polyester containing a hydrocarbon chain with a weight average molecular weight of 600 to 6,000 accounts for at least 50 weight percent of the total high molecular weight polyester component.

* * * * *